(12) United States Patent
Blackburn

(10) Patent No.: US 11,859,446 B2
(45) Date of Patent: Jan. 2, 2024

(54) CORD TIGHTENING DEVICE

(71) Applicant: Anthony Clark Blackburn, McDonough, GA (US)

(72) Inventor: Anthony Clark Blackburn, McDonough, GA (US)

(*) Notice: Subject to any disclaimer, the term of this patent is extended or adjusted under 35 U.S.C. 154(b) by 58 days.

(21) Appl. No.: 17/581,474

(22) Filed: Jan. 21, 2022

(65) Prior Publication Data
US 2023/0235625 A1 Jul. 27, 2023

(51) Int. Cl.
*E06B 9/32* (2006.01)
*F16G 11/14* (2006.01)
*E06B 9/326* (2006.01)

(52) U.S. Cl.
CPC .............. *E06B 9/326* (2013.01); *F16G 11/14* (2013.01)

(58) Field of Classification Search
CPC .................................. E06B 9/326; F16G 11/14
See application file for complete search history.

(56) References Cited

U.S. PATENT DOCUMENTS

| 5,435,044 A | 7/1995 | Ida |
| 5,934,599 A | 8/1999 | Hammerslag |
| D452,138 S | 12/2001 | Murata |
| 7,044,029 B1 | 5/2006 | Hopper, Jr. et al. |
| 7,174,575 B1 | 2/2007 | Scherer |
| 7,895,921 B2 | 3/2011 | Huang |
| 9,101,181 B2 | 8/2015 | Soderberg et al. |
| 9,737,115 B2 | 8/2017 | Soderberg et al. |
| 2006/0156517 A1 | 7/2006 | Hammerslag et al. |
| 2013/0014359 A1* | 1/2013 | Chen ...................... A42B 3/145 24/68 SK |
| 2013/0269219 A1* | 10/2013 | Burns ...................... A43C 7/08 242/395 |
| 2015/0076272 A1* | 3/2015 | Trudel ...................... A43C 7/00 242/381.4 |
| 2016/0058130 A1* | 3/2016 | Boney ...................... A43B 3/36 24/712.6 |
| 2017/0303643 A1* | 10/2017 | Converse ................ A61C 7/026 |
| 2018/0257276 A1* | 9/2018 | Hipwood .................. A61F 5/01 |
| 2020/0346888 A1* | 11/2020 | Kruse ................ A43B 23/0205 |

* cited by examiner

*Primary Examiner* — David M Upchurch

(57) ABSTRACT

A simple two-piece easily and inexpensively manufactured cord tightening device and method thereof, the device comprising: a base, cylindrical in form with walls, an interior bottom having ridges, a hollow central column, and a protrusion in the walls with an opening, the protrusion; and a handle, fashioned in the shape of a spool, with a top flange with at least one hole therein, central cylindrical cavity, and bottom flange with ridges on the bottom. The cord tightening device wherein the central cylindrical cavity of the handle fits onto the hollow central column of the base. The cord tightening device may further comprise threading in the hollow central column of the base. The cord tightening device may further comprise a screw. The cord tightening device may further comprise a spring washer. The cord tightening device may further comprise at least two holes in the top flange of the handle. The cord tightening device may further comprise a circular ridge around the central cylindrical cavity of the top flange. The cord tightening device may further comprise ridges on the outer rim of the top flange.

6 Claims, 14 Drawing Sheets

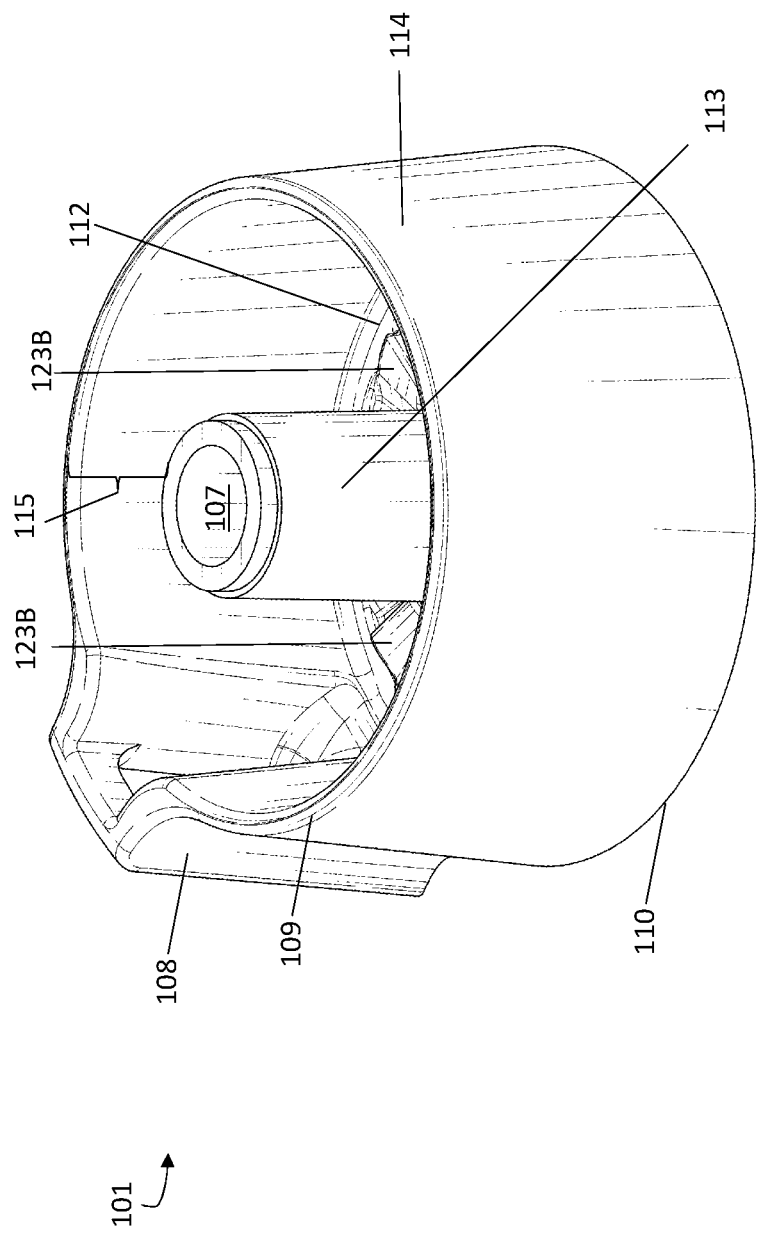

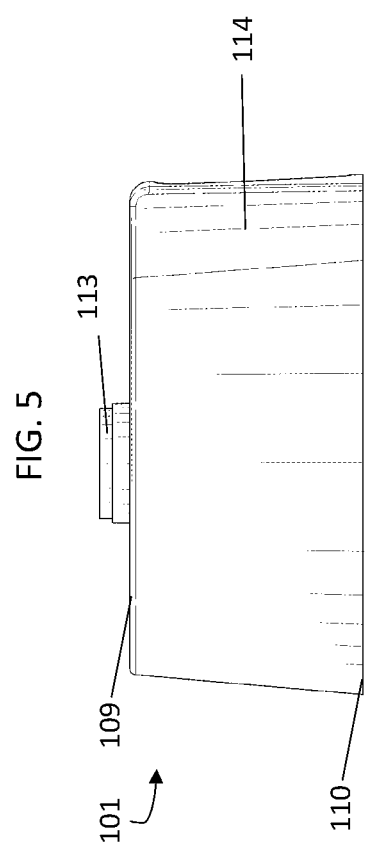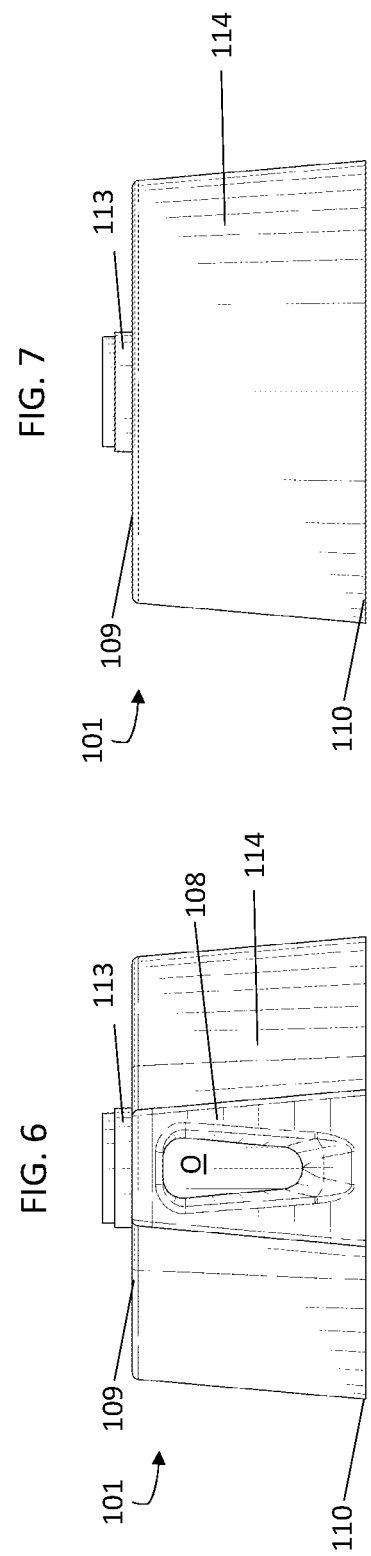

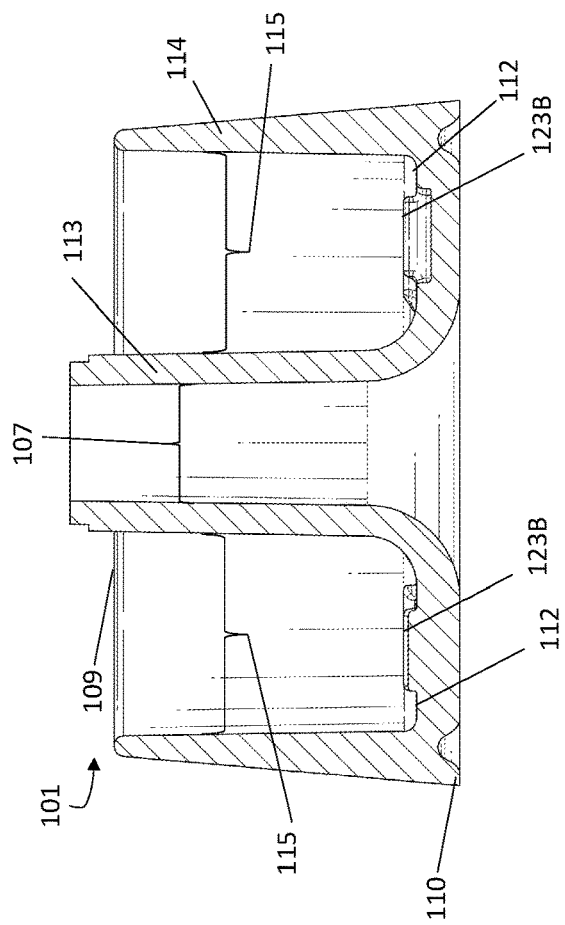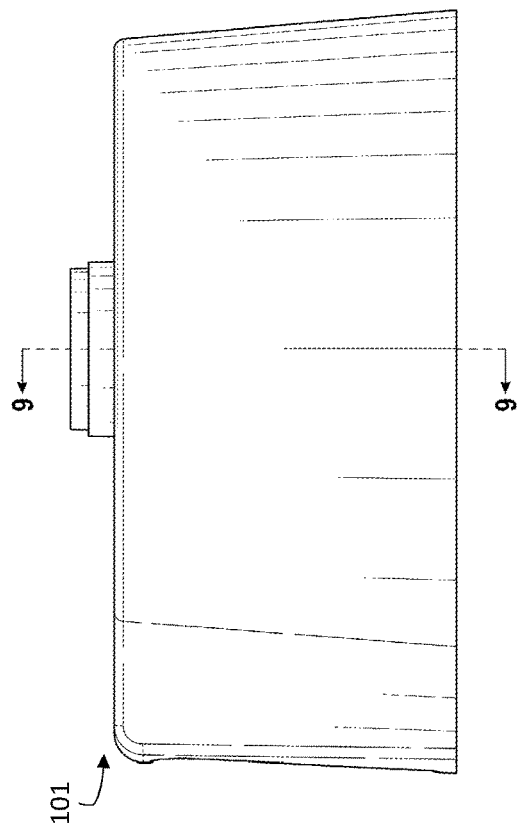

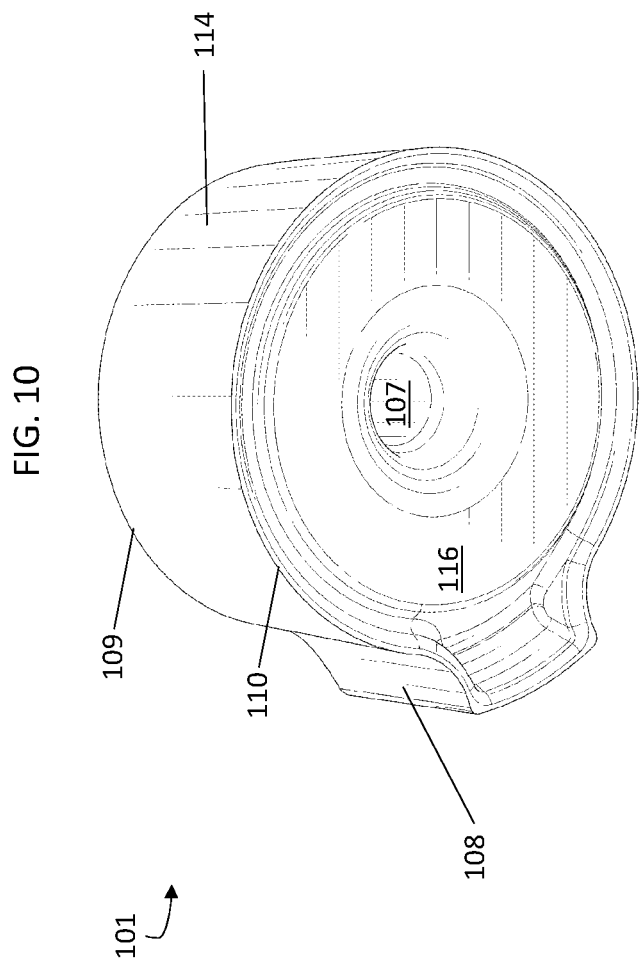

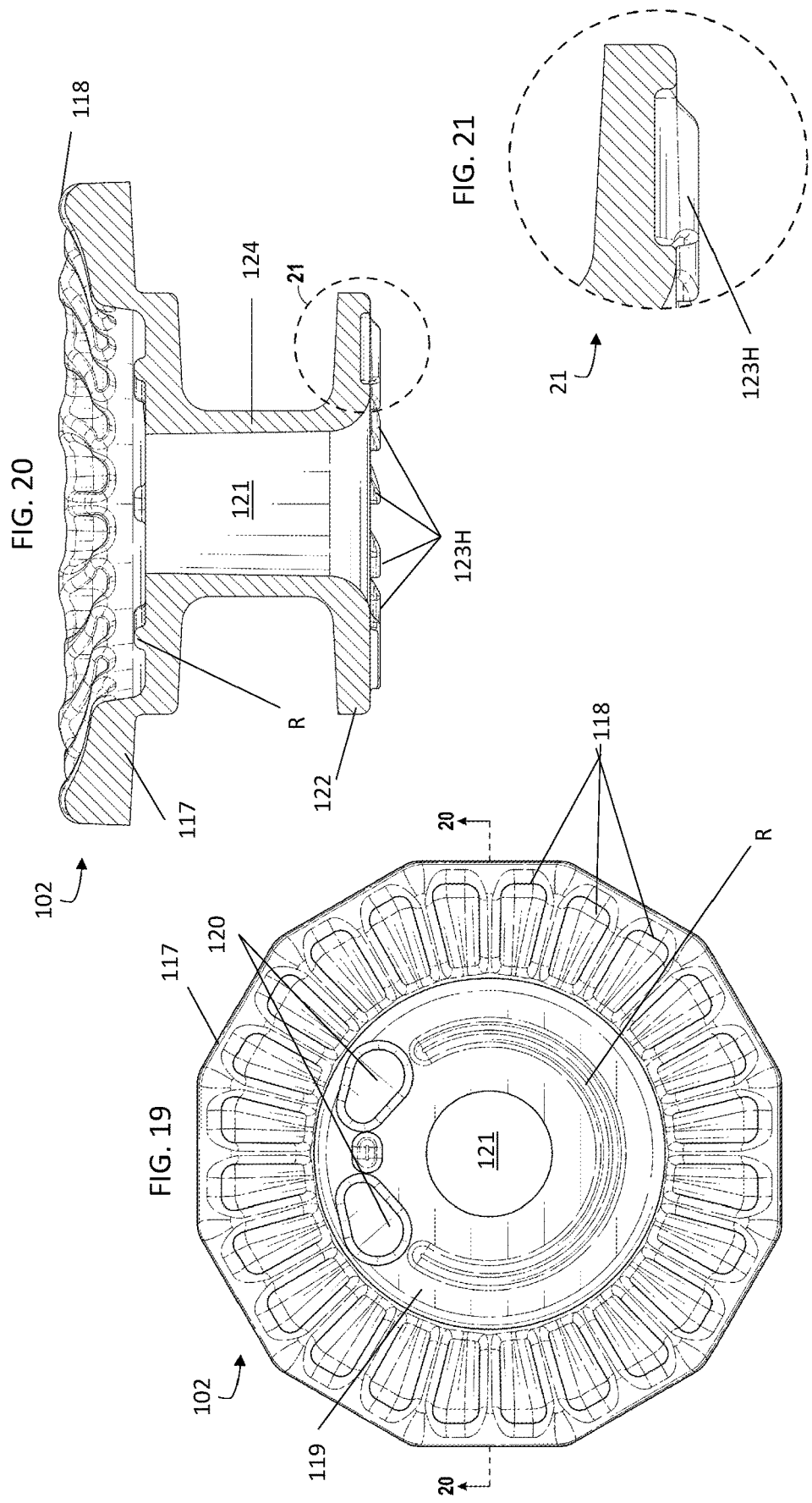

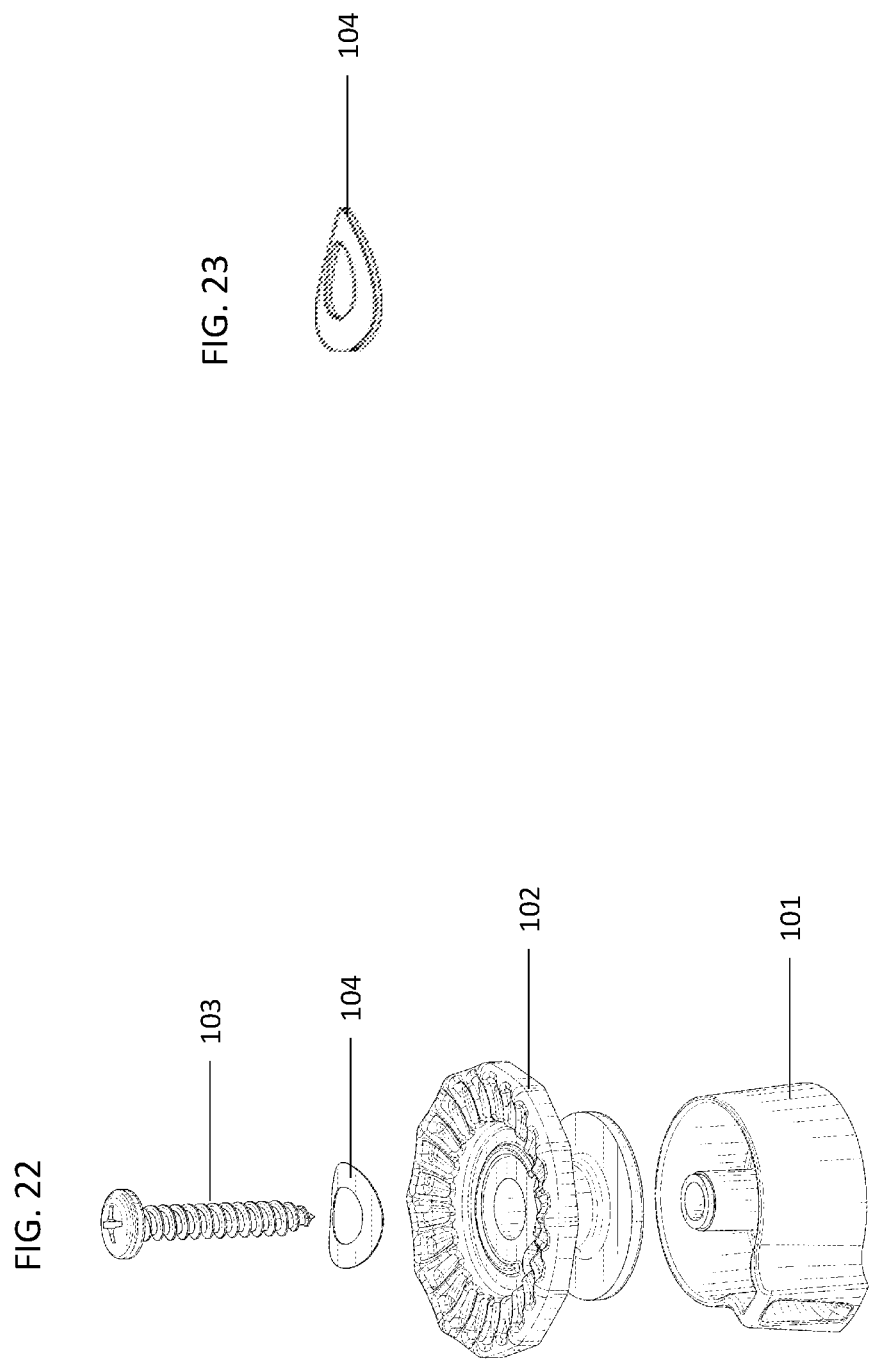

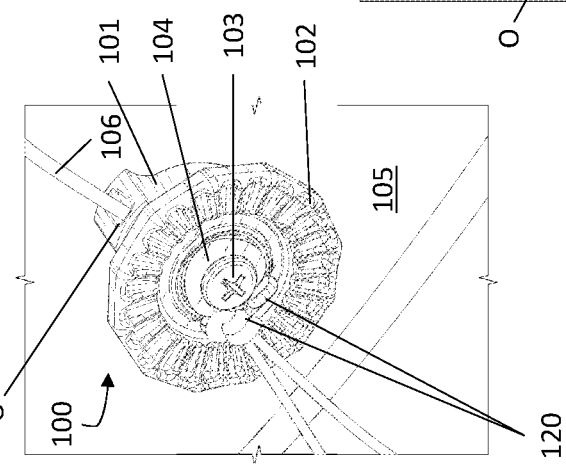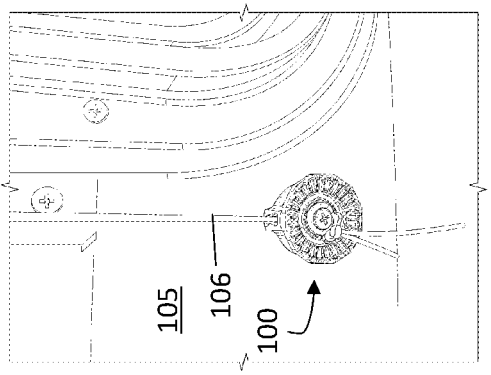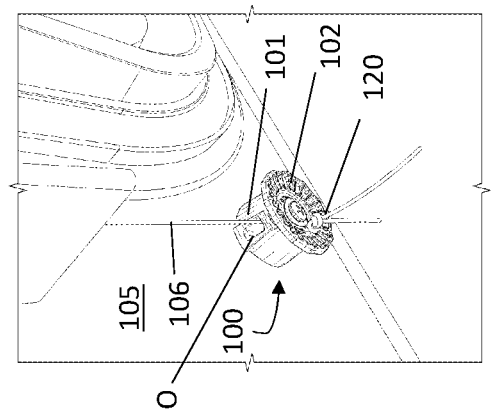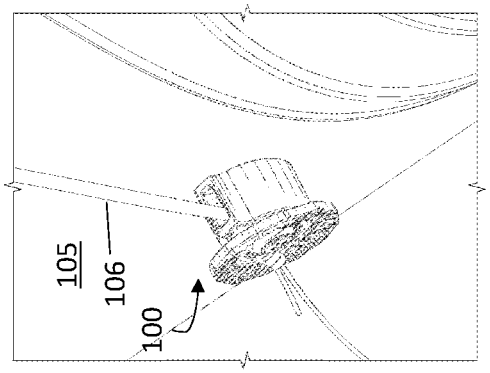

CORD TIGHTENING DEVICE

FIELD

This disclosure relates to the field of cord or string tightening devices and used for tightening cords of window shades or other like products with attached cords or string.

BACKGROUND

Cord tightening devices may come in various designs. Many as disclosed in U.S. Pat. No. 5,435,044, ES266331T3, U.S. Pat. No. 9,101,181B2, U.S. Pat. No. 9,737,115B2, TWM471175U, KR20180049217A, USD452138S1, WO2019054609A1, WO2020050562A1, EP3238561B1, and KR100998292B1 have multiple, complicated parts and thus are hard and expensive to manufacture. What is needed in the field is a simple design for a cord tightening device that is easy and inexpensive to manufacture, yet effective.

SUMMARY

The following disclosure includes a simple two-piece, easily and inexpensively manufactured device for tightening a cord or string and method thereof. The cord tightening device comprises a base, cylindrical in form with walls, an interior bottom having ridges, a hollow central column, and a protrusion in the walls with an opening in the protrusion, and a handle, fashioned in the shape of a spool, with a top flange with at least one hole therein, central cylindrical cavity, and bottom flange with ridges on the bottom. Further, the central cylindrical cavity of the handle fits onto the hollow central column of the base.

The cord tightening device may further comprise a screw to pass through the hollow central column of the base. The cord tightening device may further comprise a spring washer. The cord tightening device may further comprise at least two holes in the top flange of the handle. The cord tightening device may further comprise a circular ridge around the central cylindrical cavity of the top flange. The cord tightening device may further comprise ridges on the outer rim of the top flange.

In a second embodiment, the cord tightening device may comprise: a base, cylindrical in form with walls, an interior bottom having ridges, a hollow central column, and a protrusion in the walls with an opening; and a handle, fashioned in the shape of a spool, with a top flange with at least one hole therein, central cylindrical cavity, and bottom flange with ridges on the bottom; wherein the central cylindrical cavity of the handle fits onto the hollow central column of the base; a screw; and a spring washer.

The second embodiment of the cord tightening device may further comprise at least two holes in the top flange of the handle. The second embodiment of the cord tightening device may further comprise a circular ridge around the central cylindrical cavity of the top flange. The second embodiment of the cord tightening device further comprising ridges on the outer rim of the top flange.

The method of tightening a cord may comprise the steps of: forming a cylindrical base with an interior ridge bottom, central hollow cylindrical shaft, and walls with a protrusion and opening therein; and forming a spool shaped handle having a top flange with at least one opening, barrel, central cylindrical cavity within the barrel, and ridges on the bottom of a bottom flange. The method may further comprise fitting the spool shaped handle on the base. The method may further comprise using a screw and spring washer to attach the coupled handle and base to a surface. The method may further comprise threading a cord through the opening in the protrusion in the base and out the at least one opening of the top flange of the handle, and securing it thereto, and turning the handle in a clockwise direction to tighten a cord or a counterclockwise direction to loosen a cord.

DESCRIPTION OF THE DRAWINGS

FIG. 4 illustrates a top perspective view of the base of the disclosed cord tightening device.

FIG. 5 illustrates a right side view of the base of the disclosed cord tightening device.

FIG. 6 illustrates a front side view of the base of the disclosed cord tightening device.

FIG. 7 illustrates a back side view of the base of the disclosed cord tightening device.

FIG. 8 illustrates a left side view of the base of the disclosed cord tightening device.

FIG. 9 illustrates a cross section view of the base of the disclosed cord tightening device.

FIG. 10 illustrates a bottom perspective view of the base of the disclosed cord tightening device.

FIG. 19 illustrates a top view of the gripping handle of the disclosed cord tightening device.

FIG. 20 illustrates a cross section of the gripping handle of the disclosed cord tightening device.

FIG. 21 illustrates a base portion of the gripping handle of the disclosed cord tightening device.

FIG. 22 illustrates an expanded view of the disclosed cord tightening device with attachment means.

FIG. 23 illustrates a side perspective view of the spring washer of the disclosed tightening device.

FIGS. 24-27 illustrate various perspectives of the disclosed cord tightening device in use in a first embodiment.

Figure 1:
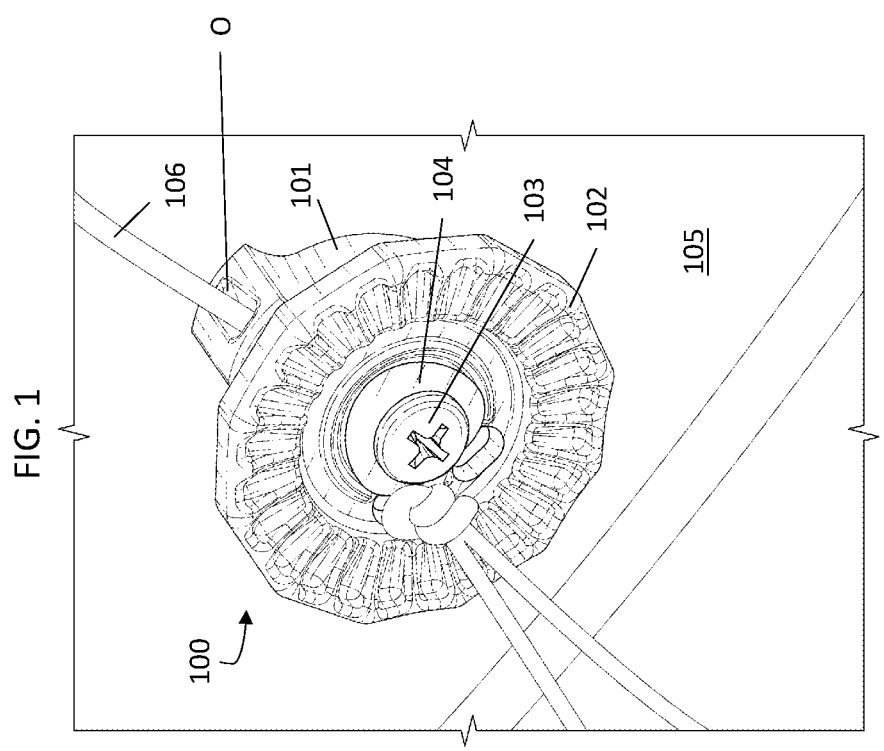
FIG. 1 is a perspective view of the disclosed cord tightening device in use in a first embodiment.

Before explaining the disclosed embodiments of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION

Various embodiments of a cord tightening device are illustrated in FIGS. 1-29. The cord tightening device of the present disclosure 100 as shown in use in FIG. 1 comprises a base 101 and gripping handle 102. Attachment or fastening devices including a screw 103 and spring washer 104 may be used to semi-permanently or permanently attach the cord tightening device 100 to a surface 105 for operation. A cord 106, or multiple cords, may be threaded through or into the cord tightening device 100 in an opening O of the base 101 such that the cord 106 may be shortened/tightened or lengthened/loosened as needed, yet hold taught in place after tightening or loosening.

The cord tightening device 100 as shown in FIG. 1, and following figures, may be made from plastics such as polycarbonate plastics, nylon, Acrylonitrile Butadiene Styrene (ABS), or other thermoplastics such as polypropylene, or thermosets. Thermoplastics become liquid, i.e. have a "glass transition" at a certain temperature, 221 degrees Fahrenheit in the case of ABS plastic. They can be heated to their melting point, cooled, and re-heated again without significant degradation. A thermoplastic is any plastic material with a low melting point that becomes molten when heated, solid when cooled, and can be re-melted or molded after cooling. The curing process is completely reversible and doing so will have little impact on the material's physical integrity. Thermoplastics are usually stored as pellets to facilitate easy melting during the injection molding process. Common examples of thermoplastics include acrylic, polyester, nylon, and PVC.

In contrast, thermoset plastics. can only be heated once which occurs typically during the injection molding process. The first heating causes thermoset materials to set resulting in a chemical change that cannot be reversed. Thermosets are usually stored in liquid form in large containers. Common examples of thermosets include epoxy, silicone, and polyurethane.

Methods of manufacture may include molding such as injection molding. For injection molding a mold is created and liquid material of manufacture is injected into the mold. This type of manufacture lends itself to high-volume, low-cost manufacturing. And because in this case, only two parts, the base 101 and gripping handle 102, comprise the cord tightening device 100, manufacture can be simple and inexpensive. Other means of manufacturing plastics may be employed such as rotational plastic molding, blow molding, extrusion, or thermoforming. Additionally, the base 101 and gripping handle 102 may be 3D printed.

Figure 3:
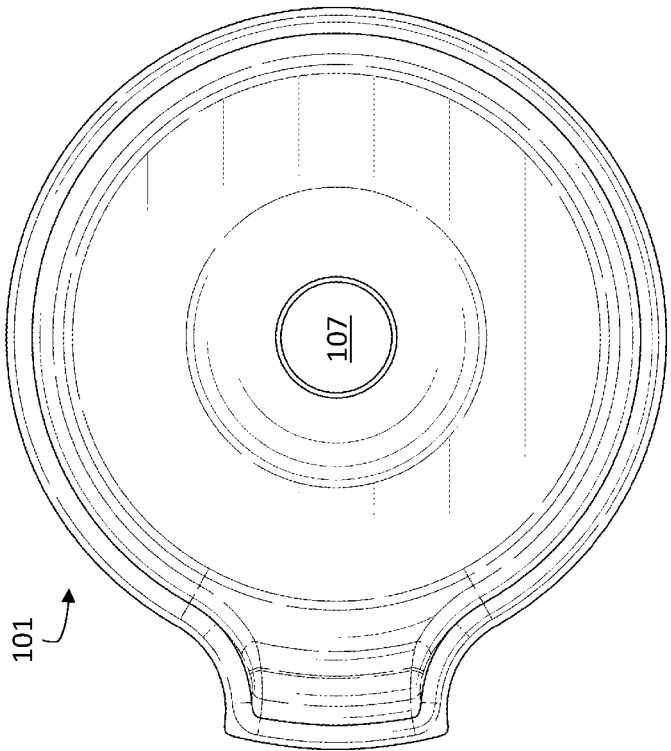
FIG. 3 illustrates a bottom view of the base of the disclosed cord tightening device.
Figure 2:
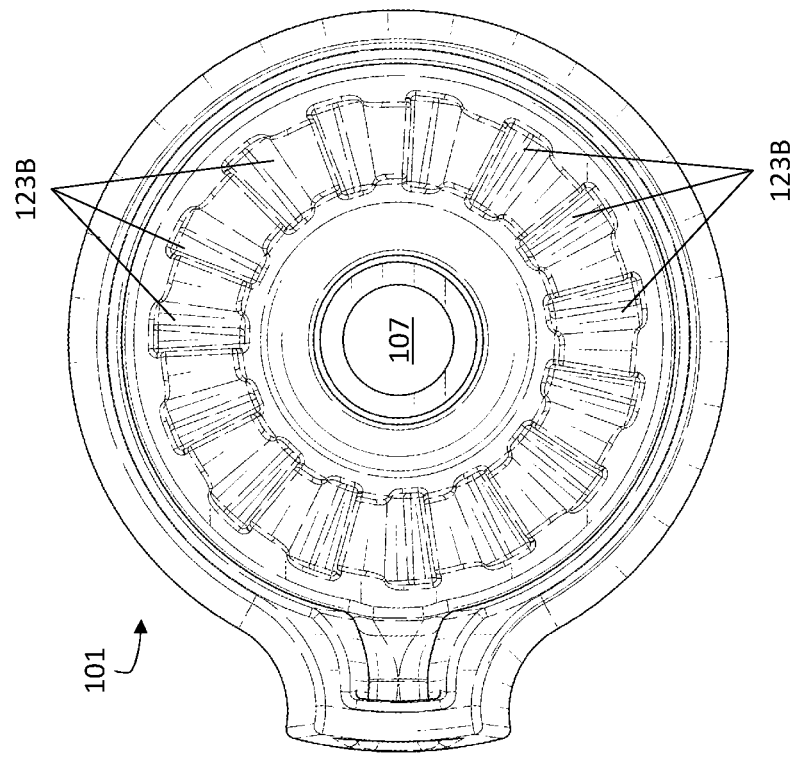
FIG. 2 illustrates a top view of the base of the disclosed cord tightening device.

FIGS. 2 and 3 are top and bottom views of the base of the cord tightening device 100, respectively. In the FIG. 2 top view, the base 101 and its interior along with the central cavity 107 that may be threaded to receive a screw but left as smooth surface as is shown in the design presented herein. Other attachment means such as a nail are envisioned. In the FIG. 3 bottom view, the base 101 and central cavity 107.

FIG. 4 is a top perspective view of the base 101 of the cord tightening device of the present disclosure. The base is generally circular in form with a protrusion 108 on one side and the central cavity 107 in the interior 115 being hollow. One may envision this interior 115 of the central cavity 107 could be threaded to receive a screw. The protrusion 108 serves to provide a smooth exit for a cord and stabilizes the base once tension is applied to the cord. The top rim 109 of the base 101 has a smaller diameter than the bottom rim 110 of the base 101. Interior base ridges 123B line a portion of the bottom interior of the base 112. The interior of the base 100 and protrusion 108 are hollow and designed to receive the gripping handle. A central column 113 forms the walls of the central cavity 107. An outer base wall 114 connects the upper rim 109 to lower rim 110. The interior 115 between the outer base wall 114 and the central column 113 is hollow.

FIGS. 5, 6, and 7 show a right, front, and back side view of the base 101, respectively. As indicated above the top rim 109 has a slightly smaller diameter than the bottom rim 110. The central column 113 is taller than the top rim 109 of the outer base wall 114 and viewable in each of the FIGS. 5, 6, and 7. FIG. 6 further illustrates the form of the protrusion 108 of the base 101 and opening O for cord entry. FIG. 8 further illustrates a side view of the base 101 and serves to orient the viewer to FIG. 9, a cross section of the base which is taken at 9, FIG. 8. As shown in FIG. 9, the top rim 109 has a slightly smaller diameter than the bottom rim 110. The central column 113 rises above the height of the top rim 109 and serves to form the hollow central cavity 107. The interior 115 between the outer base wall 114 and the central column 113 is hollow. Interior base ridges 123B and the bottom interior of the base 112 are viewable. FIG. 10 illustrates a bottom perspective view of the base of the disclosed cord tightening device. The upper rim 109 and lower rim 110, outer base wall 114, protrusion 108, and hollow central cavity are visible in this FIG. 10 view, along with the bottom exterior of the base 116.

Figure 11:
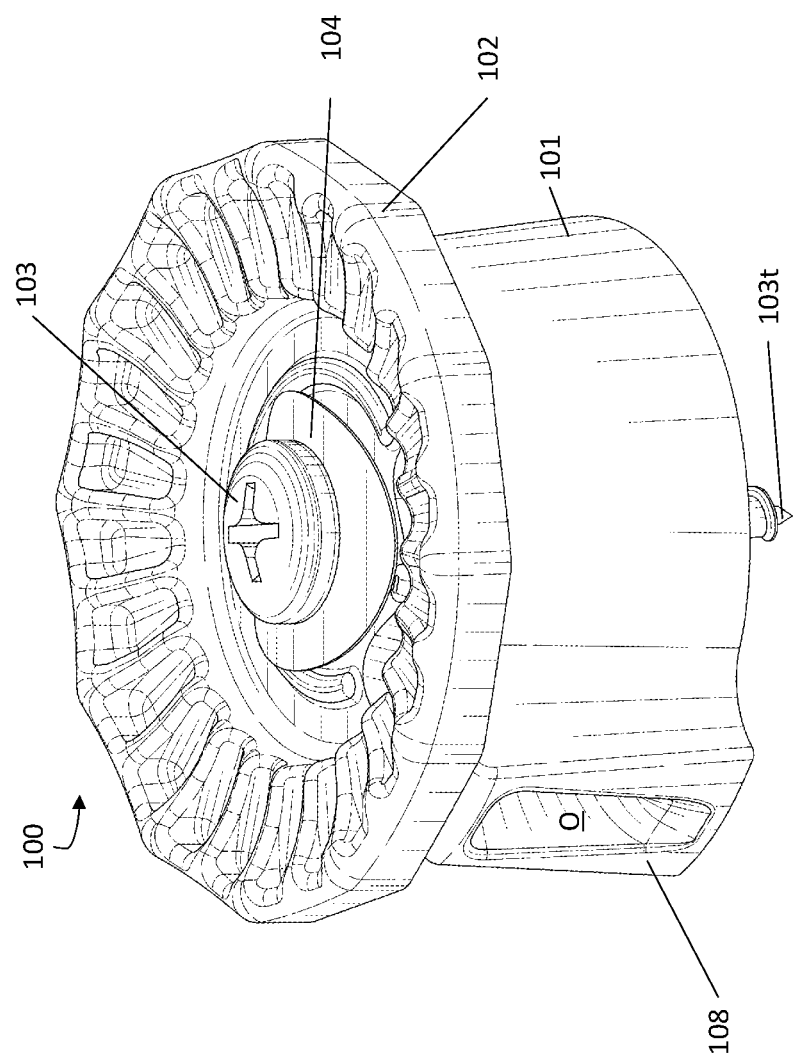
FIG. 11 illustrates a top perspective view of the disclosed cord tightening device with attachment means.

FIG. 11 illustrates a perspective view of the cord tightening device 100 with base 101, gripping handle 102, and securing devices, screw 103 and spring washer 104. The slight curved shape of the spring washer 104 is evident in this view. The spring washer is made of 'spring steel', a stainless steel that compresses when pressure is applied and springs back when the pressure is released. The screw tip 103t, which would fit into a surface, is visible below the base 101. The gripping handle 102 extends out from the base 101 and over the protrusion 108 and opening O.

Figure 12:
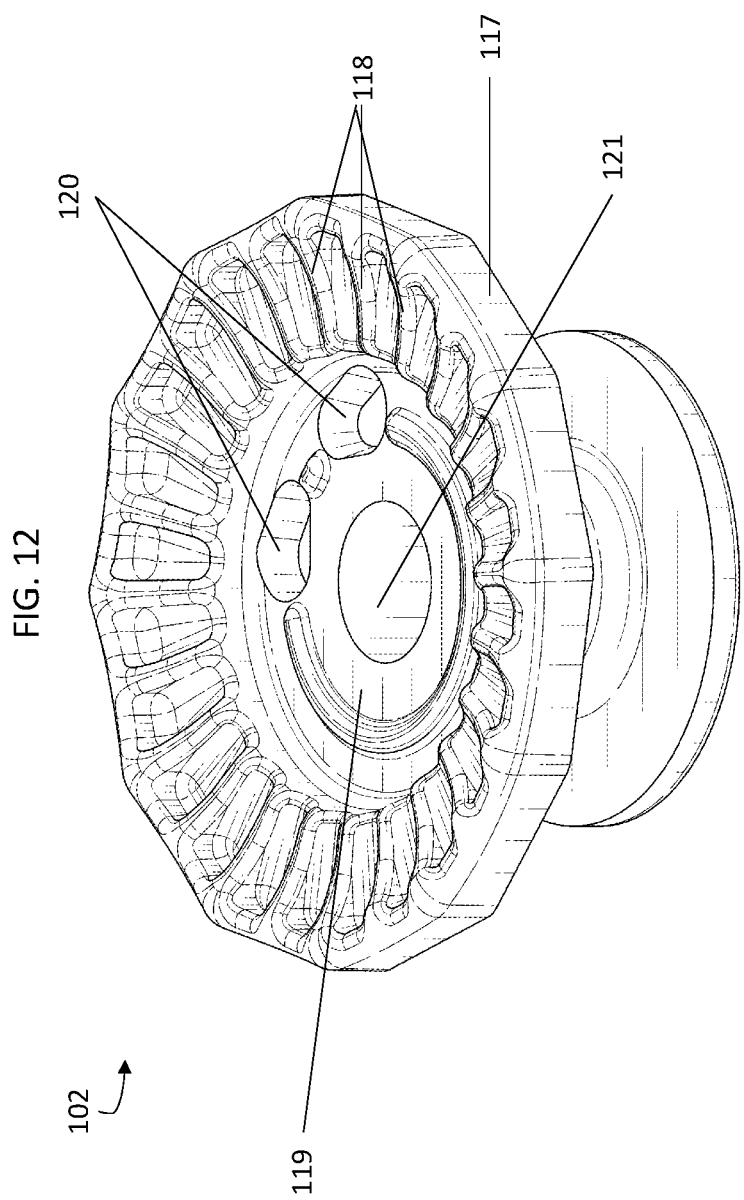
FIG. 12 illustrates a top perspective view of the gripping handle of the disclosed cord tightening device.
Figure 13:
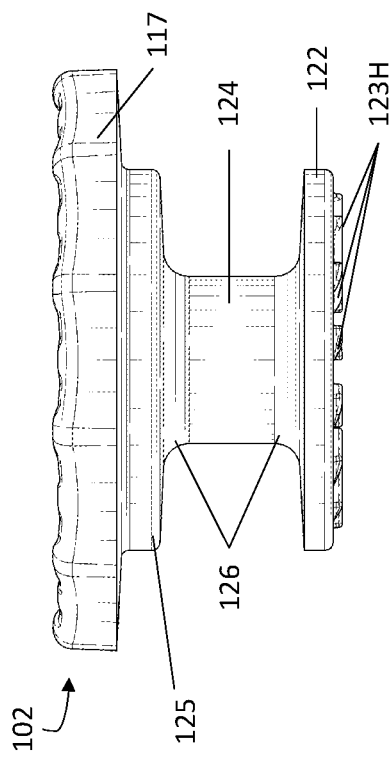
FIGS. 13, 14, 15, and 16, illustrate a front, right side, left side, and back side view of the gripping handle of the disclosed cord tightening device.
Figure 14:
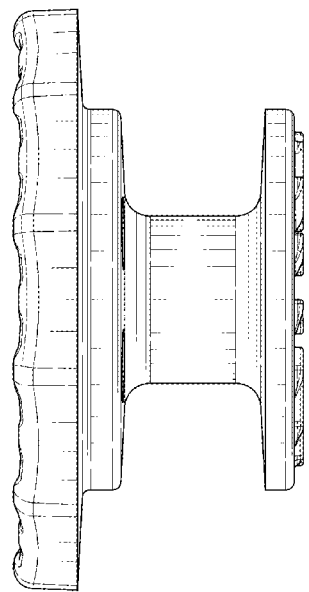
Figure 15:
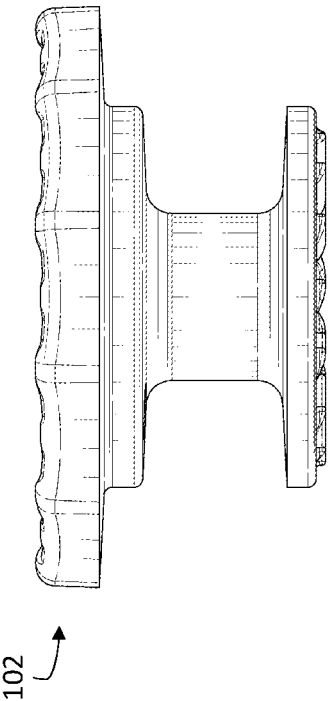
Figure 16:
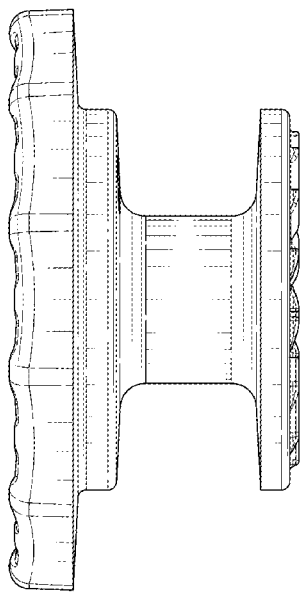

FIG. 12 illustrates a top perspective view of the gripping handle 102. The gripping handle 102 has an overall spool shape and an inner central cavity 121 that is cylindrical in shape. The top flange 117 and top flange ridges 118 that ring an inner top cavity 119. The inner top cavity 119 comprises at least one opening 120, or at least two openings 120, for a cord and the arbor or a cylindrical inner central cavity 121 which fits over the central column 113 (FIG. 4) of the base. As shown further in FIGS. 13-16, the handle bottom flange 122 comprises handle bottom ridges 123H for engaging interior base ridges in the base interior as shown in FIG. 9, 123B. The barrel 124 connects the handle top 117 with the handle bottom flange 122 and is hollow comprising the arbor or inner central cavity 121 (FIG. 12) for receiving the central column 113 (FIG. 4) of the base. Note the inner top cavity 119 (FIG. 12) bottom 125 extends below the handle top 117. Connections 126 between the tube 124 and top cavity bottom 125 and handle bottom flange 122 are continuous with arced lines, having Fillet Radii rather than squared edges. These details may be design preference.

Figure 18:
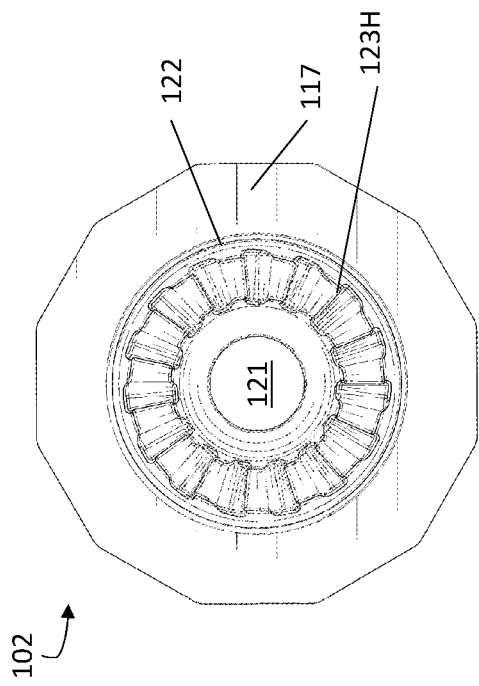
FIG. 18 illustrates a bottom view of the gripping handle of the disclosed cord tightening device
Figure 17:
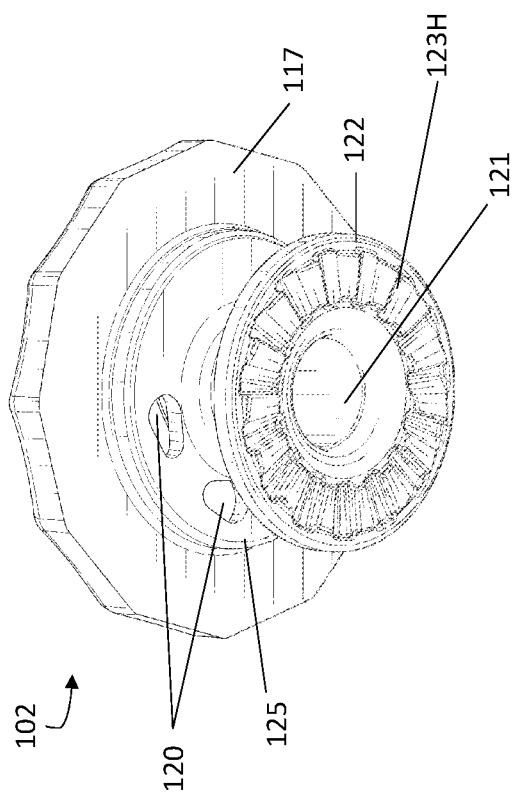
FIG. 17 illustrates a bottom perspective view of the gripping handle of the disclosed cord tightening device.
Figure 29:
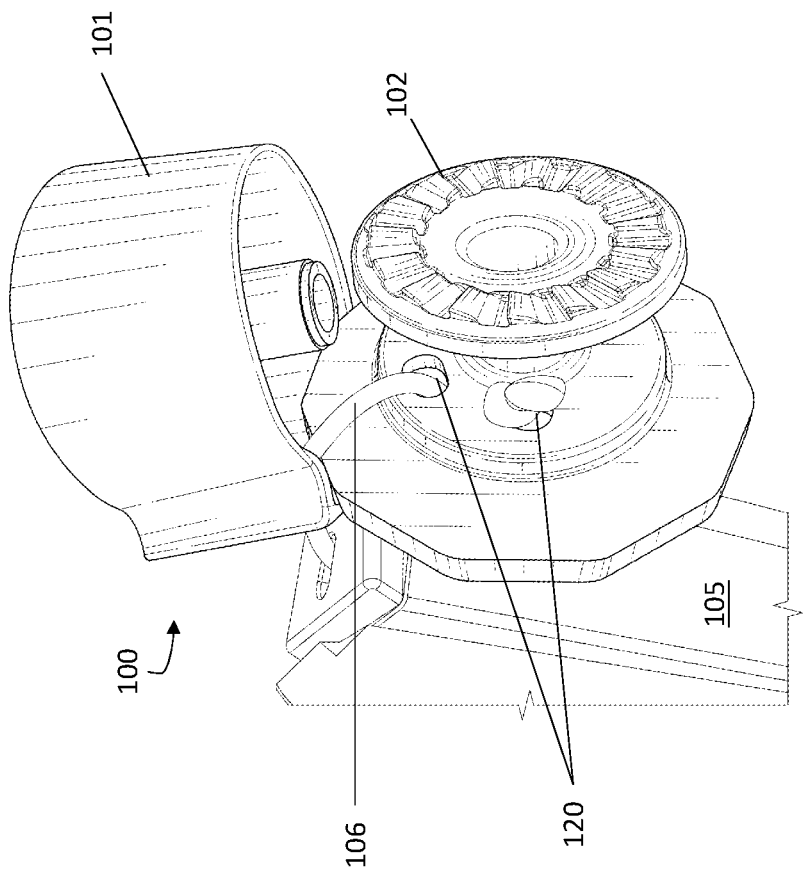
FIG. 29 illustrates how a cord may be threaded into the cord tightening device in the second embodiment.
Figure 28:
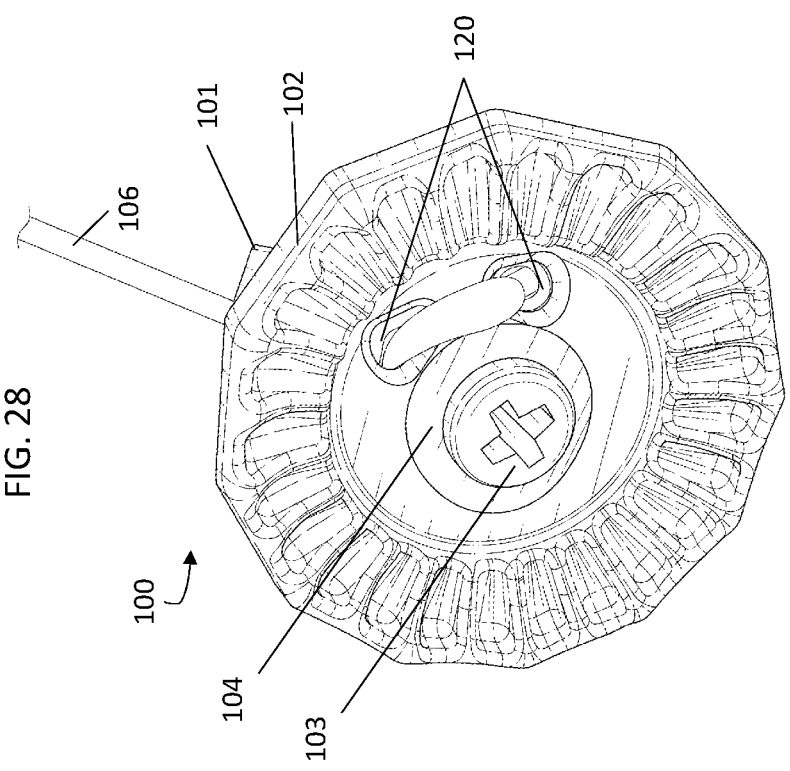
FIG. 28 illustrates a perspective view of the disclosed cord tightening device in use in a second embodiment.

FIG. 17 is a bottom perspective view of the gripping handle 102. The at least one opening or two openings 120 extend from the inner central cavity 119 (not shown) through to the bottom of the central cavity 125. The bottom handle ridges 123H of the handle bottom flange 122 are shown. The top flange 117 has a larger diameter than the handle bottom flange 122. FIG. 18 is a bottom view of the gripping handle 102. The top flange 117 and handle bottom flange 122, as well as bottom handle ridges 123H are visible along with the inner central cavity 121.

FIG. 19 illustrates a top view of the gripping handle 102. The at least one opening 120 or at least two openings 120 of the inner top cavity 119 are visible and 20 designates the view of the cross section shown in FIG. 20. The partial circular raised ridge R provides a limit for the spring washer 104 and keeps it centered on the gripping handle. A cross section of the gripping handle 102 is shown in FIG. 20. Top flange 117 and handle top ridges 118 that ring an inner top cavity 119 and an inner central cavity 121 for receiving the central column 113 (FIG. 4) of the base. The handle bottom flange 122 comprises handle bottom ridges 123H for engaging ridges 123B in the base interior as shown in FIG. 9, 123B. A barrel 124 connects the top flange 117 with the handle bottom flange 122 and is hollow comprising the inner central cavity 121 for receiving the central column 113 (FIG. 4) of the base. The highlighted area 21 illustrates these handle bottom ridges 123B that are shown in more detail in FIG. 21. As shown in the cross-section closer view, 21, FIG. 20, the FIG. 21 cross-section shows the handle bottom ridges 123H which are of the same piece as the whole gripping handle 102 being a single molded piece with equally spaced ridges 123H as shown. The purpose of these handle bottom ridges 123H is to engage the interior base ridges 123B (FIG. 2) of the bottom interior of the base 101. When the gripping handle 102 is turned clockwise, the handle bottom ridges 123H are designed to push the gripping handle up in the base 101 and then as the handle bottom ridges 123H bypass, the spring washer 104 pushes the gripping handle 102 back down in the base 101. This action will tighten the cord. If the cord needs to be loosened, the user would pull the gripping handle 102 up and rotate it counterclockwise, when released the spring washer will reengage the ridges 123H locking the gripping handle 102 rotation and controlling the cord tension.

FIG. 22 illustrates how the screw 103 and spring washer 104 fit together with the gripping handle 102 and base 101. FIG. 23 illustrates the curve of the spring washer 104. The spring washer 104 is made from 'spring steel', a stainless steel that flattens with pressure and reforms shape upon withdrawal of pressure. The slight curve of the spring washer 104 as shown in FIG. 23 allows this spring nature. Tightening the screw 103 onto the spring washer 104 ensures a snug fit of the gripping handle into the base allowing the ridges 123H of the gripping handle to engage those of the base 123B as described above. FIGS. 24-29 illustrate how a cord 106 may be threaded through the device 100 for use as a cord tightening device. The cord tightening device 100 may be fixed to a surface 105 with the screw 103 and spring washer 104. The design of the spring washer 104 ensures there is engagement between the bottom ridges of the gripping handle (not shown) and the ridges in the interior of the base 101. A cord 106, one end of which may be fixed to a window shade, for example, is threaded through the opening O in the base and through at least one of the openings 120 in the gripping handle 102. To operate the cord tightening device the gripping handle 102 is turned clockwise. This action will tighten the cord. If the cord needs to be loosened, the user would pull the gripping handle 102 up/out and rotate it counterclockwise, when released the spring washer will reengage the ridges 123H locking the gripping handle 102 rotation and controlling the cord tension.

Although the present invention has been described with reference to the disclosed embodiments, numerous modifications and variations can be made and still the result will come within the scope of the invention. No limitation with respect to the specific embodiments disclosed herein is intended or should be inferred. Each apparatus embodiment described herein has numerous equivalents.

What is claimed is:

1. A cord tightening device, the device consisting of:
    a) a base being cylindrical in form with an outer wall and an interior bottom having ridges, a hollow central column, and a protrusion in the outer wall having an opening;
    b) a single piece handle, fashioned in the shape of a spool, with a top flange with at least one hole therein, central cylindrical cavity, and bottom flange with ridges on the bottom, wherein the central cylindrical cavity of the handle fits onto the hollow central column of the base;
    c) a spring washer fitted to the top of the central cylindrical cavity of the handle; and
    d) a screw that fits into the central cylindrical cavity of the handle and fixes the spring washer to the handle.

2. The cord tightening device of claim 1 further comprising at least two holes in the top flange of the handle.

3. The cord tightening device of claim 1 further comprising a circular ridge around the central cylindrical cavity of the top flange.

4. The cord tightening device of claim 1 further comprising ridges on the outer rim of the top flange.

5. A method for tightening a cord, the method consisting of the steps:
    1 forming a cylindrical base with an interior ridge bottom, central hollow cylindrical shaft, and outer walls with a protrusion and opening therein;
    2 forming a spool shaped handle in a single molded piece having a top flange with at least one opening, barrel, central cylindrical cavity within the barrel, and ridges on the bottom of a bottom flange;
    3 fitting the spool shaped handle on the base with a spring washer and screw;
    4 threading a cord through the opening in the protrusion in the base and out the at least one opening of the top flange of the handle and securing the cord thereto; and
    5 turning the handle in a clockwise direction to tighten the cord.

6. The method of claim 5 further comprising turning the handle in a counterclockwise direction to loosen the cord.

* * * * *